United States Patent
Schartau (10) Patent No.: US 7,701,662 B2
(45) Date of Patent: Apr. 20, 2010

(54) CARTRIDGE REEL LOCK RELEASE SENSING SYSTEMS AND METHODS

(75) Inventor: Kristian S. Schartau, Bloomfield, CO (US)

(73) Assignee: Quantum Corporation, San Jose, CA (US)

(*) Notice: Subject to any disclaimer, the term of this patent is extended or adjusted under 35 U.S.C. 154(b) by 713 days.

(21) Appl. No.: 11/698,437

(22) Filed: Jan. 26, 2007

(65) Prior Publication Data

US 2008/0180831 A1    Jul. 31, 2008

(51) Int. Cl.
*G11B 5/09*    (2006.01)

(52) U.S. Cl. ............................................... 360/85

(58) Field of Classification Search .................. 360/85, 360/95, 96.51
See application file for complete search history.

(56) References Cited

U.S. PATENT DOCUMENTS

| | | | |
|---|---|---|---|
| 5,760,995 A | 6/1998 | Heller et al. | |
| 5,901,916 A | 5/1999 | McAllister et al. | |
| 6,189,371 B1 * | 2/2001 | Hirano | 73/66 |
| 6,572,046 B2 | 6/2003 | Brummet | |
| 6,693,757 B2 * | 2/2004 | Hayakawa et al. | 360/69 |
| 6,908,055 B2 | 6/2005 | Hoelsaeter et al. | |
| 6,923,395 B2 | 8/2005 | deLassus | |
| 2001/0040751 A1 * | 11/2001 | Hayakawa et al. | 360/69 |
| 2002/0096261 A1 * | 7/2002 | Yang | 156/352 |
| 2005/0011986 A1 * | 1/2005 | Foo et al. | 242/532.6 |

FOREIGN PATENT DOCUMENTS

JP         2008217966 A  *  9/2008

* cited by examiner

*Primary Examiner*—Allen T Cao
(74) *Attorney, Agent, or Firm*—Roeder & Broder LLP; James P. Broder (57) ABSTRACT

A tape drive having a reel release sensing procedure and system is provided. In one example, the tape drive includes a motor coupled to a reel driver for driving a reel of a storage device, a sensor for detecting movement associated with the reel driver, and a controller. The controller operates to activate the motor to rotate the reel driver prior to coupling the tape to a drive leader. The controller further determines if the reel driver moved in response to activating the motor based on a signal from the sensor, and causes the tape to be loaded into the drive if the reel moved (or moved more than a predetermined amount/distance). For example, the controller may determine the reel is released if the reel driver moved in response to activating the motor and is not released otherwise.

26 Claims, 6 Drawing Sheets

CARTRIDGE REEL LOCK RELEASE SENSING SYSTEMS AND METHODS

BACKGROUND

1. Field of the Invention

The invention relates generally to storage media drives and removable storage media devices, and in one example, to a storage media drive having a reel lock release sensing system and method.

2. Related Art

Magnetic tape cartridges have been used to conveniently and efficiently store and handle magnetic recording media for tape drives. One type of tape cartridge consists of a substantially rectangular exterior cartridge housing and a single reel containing a magnetic tape positioned within the housing. The cartridge housing includes an upper housing section and a lower housing section that substantially enclose the magnetic tape, which includes a cartridge leader. The cartridge leader becomes exposed through an opening in the cartridge housing during insertion of the cartridge into the tape drive. The tape drive is then able to engage and retrieve the tape from the cartridge for recording and/or playback.

The reel includes a hub, one or more flanges, and a plurality of teeth that are exposed through an access opening in the lower housing section. A reel driver (sometimes referred to as a drive clutch) on the tape drive engages the teeth in order to rotate the reel and load the tape (i.e., unwind the tape) into the drive. Typically, a spring within the cartridge housing biases the reel toward the opening in the lower housing section. During engagement between the reel driver and the teeth, the tape drive exerts a force against the reel, urging the reel toward the upper housing section, thereby partially compressing the spring to promote a secure engagement between the drive clutch and the reel. The tape drive then rotates the reel and guides the tape across a data transducer that reads data from and/or writes data to the tape.

A cartridge further typically includes at least one reel lock mechanism to prevent the reel from rotating when not positioned within a tape drive receiver, thereby securing the media within the cartridge housing until the one or more reel locks are released or disengaged within the media drive. For example, a typical DLT tape cartridge includes two reel lock mechanisms, both of which are released when in a media drive to enable the tape drive to load the media. Damage to the tape drive, the cartridge, or both may results if one or more of the reel locks fails to release properly when the cartridge is inserted into the tape drive and an attempt is made to load the media. For example, the tape drive leader integrity may be compromised if the reel locks are not properly released when attempting to load the media.

BRIEF SUMMARY

In one example of one aspect of the invention, a tape drive having a reel lock release procedure and system is provided. The tape drive includes a motor coupled to a reel driver for driving a reel of a storage device, a sensor for detecting movement associated with the reel driver, and a controller. The controller operates to activate the motor to rotate the reel driver prior to coupling the tape to a drive leader. The controller further determines if the reel driver moved in response to activating the motor based on a signal from the sensor, and if the reel moved sufficiently (and is therefore released) the controller may proceed to load the tape from the storage device into the tape drive.

The controller may determine the reel is released if the sensor detects movement of the reel driver greater than a predetermined amount and locked or otherwise secured if the movement is less than the predetermined amount. The controller may further cause or issue an error signal if the reel is not released.

The sensors may include a variety of sensors for detecting movement (or position) of the reel driver. For example, one or more hall sensors, optical sensors, current sensors, or combination thereof may be used.

In another example, a tape media drive for use with a removable storage device having a rotatable reel includes a controller for activating the motor to rotate the reel driver in a direction to unwind tape from the reel and determining if the reel is released based upon a signal from the sensor, the signal associated with movement of the reel driver. In one example, the controller activates the motor and determines if the reel is released prior to coupling the tape of the storage device to a drive leader, e.g., prior to buckling a drive leader to a cartridge leader.

According to another example of another aspect of the invention, a media drive controller is provided. In one example, the media drive controller comprises logic for commanding a reel driver to rotate a reel of a storage device in a direction to unwind tape from the reel, detecting movement of the reel driver based on a signal received from at least one sensor, and loading the media if the detected movement exceeds a predetermined amount. In one example, the method further includes coupling a drive leader to a tape leader of the storage device if the detected movement exceeds the predetermined amount, and streaming the tape from the storage device into the tape drive.

According to another example of another aspect of the invention, a method for sensing if a reel of a storage device is released when received in a media drive. In one example, the method includes commanding a reel driver to rotate a reel of a storage device in a direction to unwind tape from the reel, detecting movement of the reel driver based on a signal received from at least one sensor, and loading the media if the detected movement exceeds a predetermined amount.

The present invention is better understood upon consideration of the detailed description below in conjunction with the accompanying drawings and claims.

DETAILED DESCRIPTION OF THE INVENTION

The following description is presented to enable a person of ordinary skill in the art to make and use the various aspects and examples of the inventions. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limiting to the examples described and shown, but is to be accorded the scope consistent with the appended claims.

Typical tape cartridges include one or more reel lock mechanisms for securing the cartridge reel and storage tape inside the cartridge until released by a tape drive mechanism. For example, there are typically two reel lock mechanisms inside a DLT™ Tape cartridge, both of which are released before streaming the media from the cartridge into the tape drive. Additionally, LTO™ tape cartridges typically include a reel lock, which is released prior to loading the media. If one or more locks associated with a cartridge fails to release, the tape drive will not function properly and the tape cartridge may be rejected by the tape drive. However, the tape drive may not detect that the reel locks failed to release until the drive leader buckling mechanism releases the drive take-up leader at an expected position of the cartridge leader, at which point the drive leader integrity may be compromised and may not be able to recover if the reel locks are not properly released. In particular, the tape drive may drop the take-up reel leader, eject the cartridge while buckled to the leader, and so on. Such results may lead to drive failure, damage to the tape drive, damage to the cartridge leader or media, or combinations thereof.

In one example described herein, a media tape drive operates to sense if one or more reel locks associated with a storage device (e.g., a tape cartridge) have been released prior to an attempt to unload the media from the storage device. In particular, the tape drive operates (e.g., via the tape drive controller) to activate the reel driver motor in an attempt to rotate the reel driver and a reel of the storage device prior to coupling the drive leader to the storage tape of the cartridge, and in a direction to unwind the storage tape from the reel. The tape drive further includes one or more sensors for detecting movement associated with rotation of the reel driver in response to activating the reel driver motor. The tape drive may determine that the reel of the storage device is released if the reel rotates sufficiently (e.g., the reel rotates at all or rotates more than a predetermined amount) and, if released, the tape drive may proceed to load and stream the media into the tape drive.

Alternatively, if the tape drive fails to detect that the reel driver rotated in response to activating the reel driver motor (or at least fails to rotate a sufficient amount or distance), the tape drive determines that the cartridge reel is not released, e.g., at least one reel lock remains engaged or the reel is otherwise prevented from rotating. In such an instance the tape drive may attempt to release the locks, eject the cartridge, issue an error message, or the like. Accordingly, the exemplary system and reel lock release sensing method may allow the tape drive to reject a storage device before causing drive loading errors, damage to the tape drive, the media, or both.

Figure 1A:
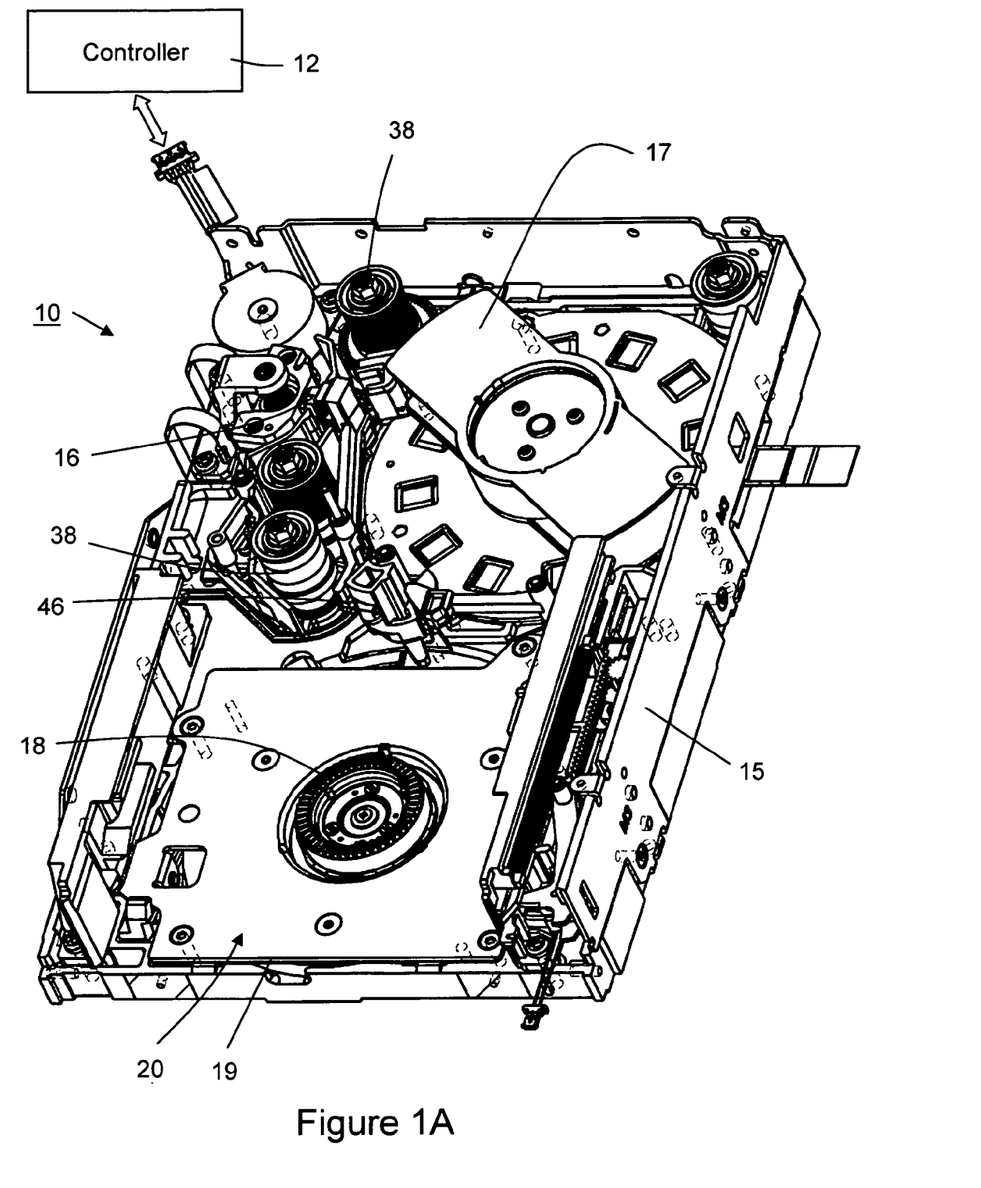
FIGS. 1A and 1B illustrate perspective views of an exemplary tape media drive for performing a reel lock release sensing system.
Figure 1B:
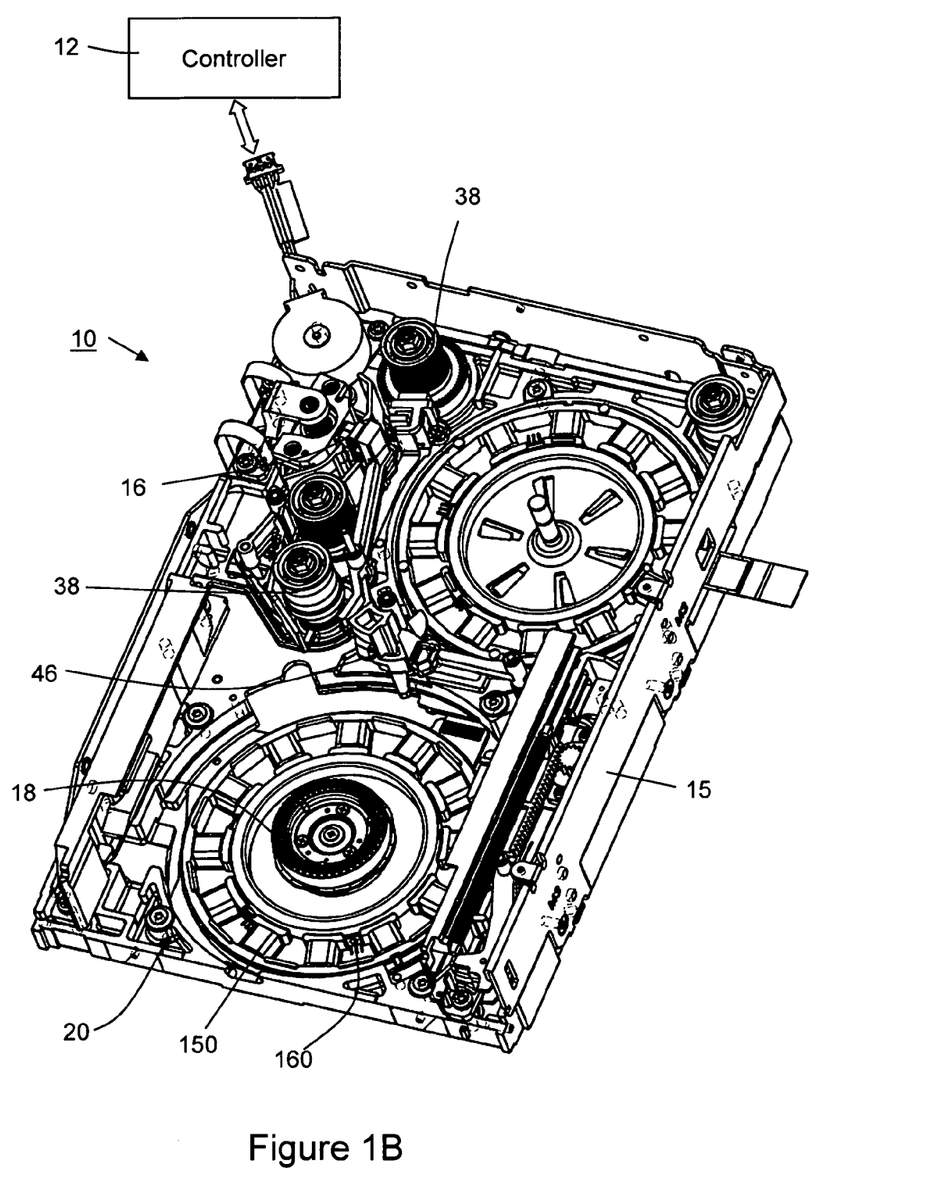
Figure 3:
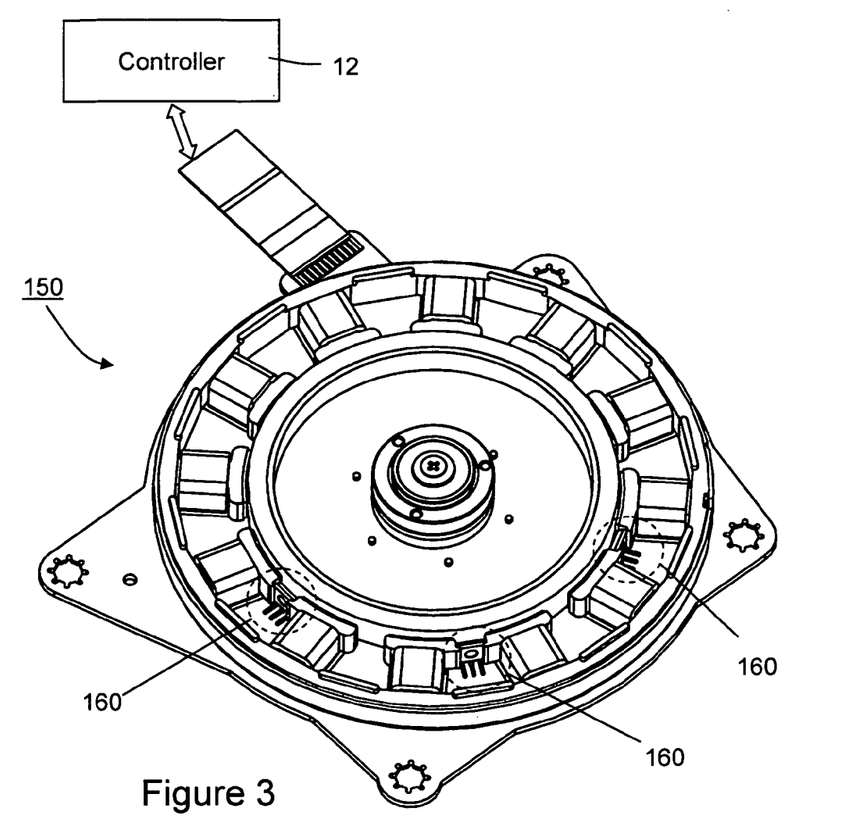
FIG. 3 illustrates a perspective view of an exemplary reel drive motor and position/movement sensors.
Figure 4:
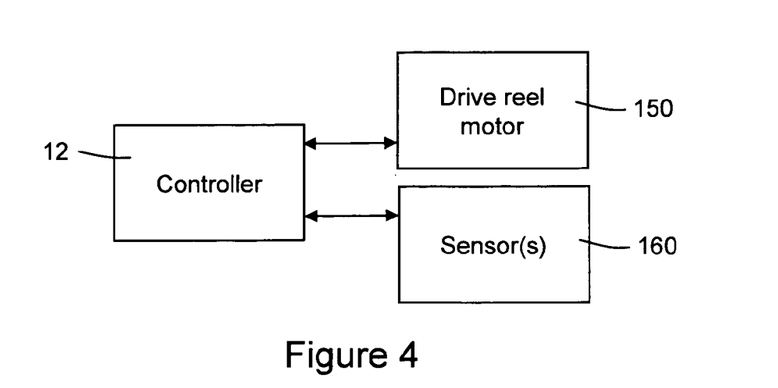
FIG. 4 illustrates a schematic view of an exemplary reel release sensing system.

FIGS. 1A and 1B illustrative an exemplary media tape drive 10 operable to sense if a storage device (e.g., a tape cartridge) is released. Additionally, and referenced in conjunction with the description of tape drive 10, FIGS. 2A and 2B illustrate an exemplary tape cartridge 24 for use with tape drive 10, FIG. 3 illustrates a more detailed view of an exemplary drive motor 150 and positions sensors 160 of tape drive 10, and FIG. 4 illustrates schematically the communications between a controller 12 of tape drive 10 and components of the media drive (e.g., motor 150 and sensors 160).

Broadly speaking, tape drive 10 includes a tape drive housing 15, a data transducer, i.e., read and/or write head 16, a take-up reel 17, and a receiver 20. Receiver slot 20 is configured to receive a suitable cartridge 24 therein adjacent reel driver 18. Reel driver 18 is driven by a motor 150 and positioned with or adjacent motor 150 is one or more sensors 160 for detecting motion of reel driver 18 and/or supply reel 28 of cartridge 24 (see FIGS. 1B and 3 for a more detailed view of motor 150 and sensors 160). It is noted that FIG. 1B illustrates tape drive 10 with floor 19 of receiver 20 removed to illustrate the underlying motor 150 of reel driver 18 as well as sensors 160 for detecting movement of reel driver 18.

Receiver slot 20 or floor 19 may include a boss or other element(s) to engage cartridge 24 for unlocking one or more locking mechanisms associated therewith. Tape drive 10 may also include a door and various mechanisms for receiving and ejecting cartridge 24. When cartridge 24 is received in receiver slot 20 a buckler motor 46 or the like may engage a cartridge leader 26 and stream storage tape 27 along a tape path within tape drive 10 passing read/write head 16 and onto take-up reel 17. The tape path may include various roller 38, tape guides, one or more read/write heads 16, and the like before being wound upon take-up reel 17.

Figure 2A:
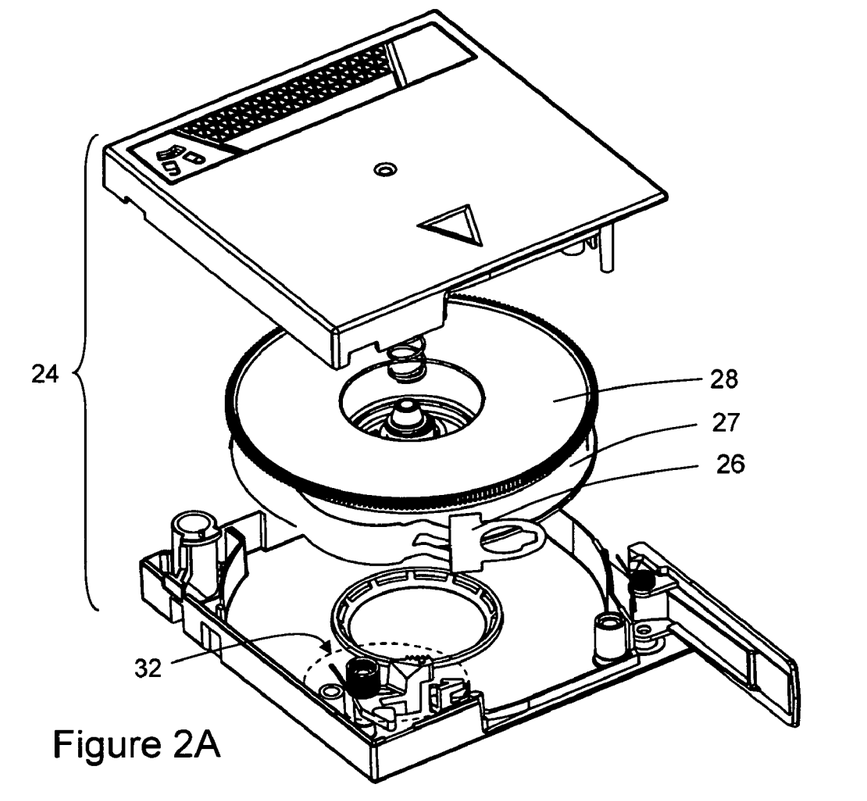
FIG. 2A illustrates an exploded view of an exemplary tape media cartridge.
Figure 2B:
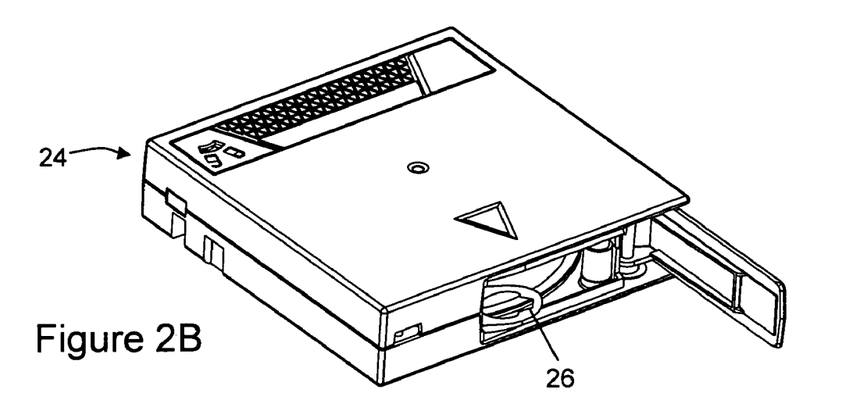
FIG. 2B illustrates a perspective view of an exemplary tape media cartridge as shown in FIG. 2A.

An exemplary cartridge 24 is illustrated in FIGS. 2A and 2B. In particular, FIG. 2A illustrates an exploded view of cartridge 24, and FIG. 2B illustrates a perspective view of an assembled cartridge 24. In this example cartridge 24 includes a substantially rectangular cartridge housing which encloses cartridge reel 28 and storage tape 27. Cartridge 24 may further include a cartridge door to protect storage tape 27 therein and a cartridge leader 26, which is exposed when the door is open. The housing of cartridge 24 may be of any shape or dimension which permits reel 28 to be contained therein, and which allows cartridge 24 to appropriately fit into a corresponding tape drive.

Storage tape 27 stores information in a form, e.g., digital, that may be subsequently retrieved if desired. Storage tape 27 stores information magnetically, optically, or in combinations thereof. Storage tape 27 may be approximately one-half inch in width, but larger and smaller widths are contemplated, e.g., 4-8 mm. Storage tape 27 may have a thickness of approximately 0.5 mils (0.0005 inch) or thinner. Typically, storage tape 27 includes a storage surface on one side of storage tape 27 that may be divided into a plurality of parallel tracks along the length of storage tape 27. Alternatively, the data may be recorded in diagonal strips across storage tape 27.

In one example, cartridge 24 is inserted into tape drive 10, floor 19 of receiver slot 20 raises to engage cartridge 24 and release the cartridge reel locks (e.g., reel lock 32 shown in FIG. 2A). Once cartridge 24 is received and the reel locks are to have been released, the drive controller 12 may command a current to the cartridge reel motor 150 in an attempt to move the cartridge reel driver 18 (and thus the cartridge reel 28) in a direction to unwind tape 27 from reel 28 of cartridge 24, in this example, in a counterclockwise direction.

Generally, the amount of rotation needed to determine if reel 28 is released is minimal, e.g., a fraction of one revolution, such that only a small amount of tape 27 will be displaced within the housing of cartridge 24. The direction to unwind the tape is chosen because generally a cartridge reel will be constrained from rotating in a direction to wind the tape on the reel by the cartridge leader and/or buckle mechanism; however, in other examples it may be possible for some storage devices to rotate in a winding direction to determine if the reel is released.

If the reel lock(s) are released, and there is no other obstruction, reel driver 18 and cartridge reel 28 should rotate in response to driving reel motor 150. Sensors 160 are positioned to detect such movement (or a change in position) of reel driver 18. In particular, controller 12 receives signals from sensors 160 associated with the movement, or lack of movement, of reel driver 18 as or after the reel is activated to move. Controller 12 may determine if the reel is released and whether to continue to load the media (i.e., stream the tape from the cartridge in a normal load operation) based on the received signals from sensors 160.

In one example, sensors 160 may include hall sensors disposed around a portion of motor 150 as shown. Various other sensors are possible and contemplated such as optical sensors for detecting the motion or position of reel driver 18. Additionally, in yet other examples, sensors for detecting the current to motor 150 (which may indicate whether reel driver 18 has moved) may be used. It should be recognized that various sensors and schemes for detecting movement (or changes in position, which is used interchangeable with detecting movement herein) of the reel driver 18 and cartridge reel 28 are possible.

In one example, motor 150 is controlled to attempt to cause a rotation in the counterclockwise direction of $3/48$ of a revolution. The rotation amount may be chosen to provide a sufficient rotation for sensors 160 to accurately detect movement while not unspooling a large amount of tape. For example, sensors 160 may include hall sensors, where a single rotation provides 48 hall counts from sensors 160 such that the movement of $3/48$ of a revolution provides approximately 3 halls of movement (less than 3 halls of movement may provide inaccurate readings). Of course, depending on the particular sensors, motor, media drive, etc., more or less rotation may be sufficient or desirable.

Further, in such an example, $3/48$ of a revolution unspools about 0.7 inches of media for a typical DLT™ Tape cartridge, which generally does not damage the media and is sufficient for sensors 160, e.g., hall sensors, to detect movement. Again, for other storage devices more or less rotation may be desirable to reduce potential damage to the media and provide sufficient movement for sensing if the reel is released.

Further, in one example, motor 150 is commanded or controlled with a current that is ramped up to a predetermined value or limit. The current may be limited to prevent damage to the media drive 10 or cartridge 24 if the reel locks are engaged, a stick slip situation occurs, or another obstruction exists. In one example sensors 160 feedback position information to controller 12 as the current to the motor 150 is increased to the predetermine value. Controller 12 receives signals from sensors 160 and may cease activating motor 150 to move when either sufficient motion is detected to determine the reel is released or the predetermined value is reached (in which case controller 12 determines the reel is not released if movement is not detected).

In one example, controller 12 is configured to determine the cartridge reel is released if any movement of reel driver 18 is detected. However, in some examples even with one or more reel locks engaged, a small amount of movement may be possible; accordingly, in some examples controller 12 is configured to determine the cartridge reel is released if movement is detected that exceeds a predetermined amount, and that the cartridge reel is not released if the movement is below the predetermined amount.

FIG. 4 illustrates a schematic view of controller 12, drive reel motor 150, and sensors 160. Generally, controller 12 includes logic for causing movement of drive reel motor 150, for example, by commanding a current to motor 150. Additionally, controller 12 receives signals from sensors 160, where the signals are associated with the movement or change in position of reel driver 18. Controller 12 further includes an algorithm or logic (which may be embodied in software, hardware, firmware, or combinations thereof) for analyzing the signals received from sensors 160 and determining if the cartridge reel is released according to the examples described herein. Additionally, an exemplary method, which may be carried out by controller 12, is further described below with respect to FIG. 5.

It should be noted that tape drive 10 may include various other features; for example, various additional or alternative buckler systems, rollers, tape guides, receiving mechanisms, dampers, and the like may be used. Additionally, although generally described with respect to a magnetic storage drive and magnetic storage cartridge, the examples are equally applicable to other media drives, e.g., optical storage drives, as well as storage cassettes (e.g., a storage device including two or more reels).

Tape drive 10 is typically installed within or associated with a computer (not shown) or computer network. Additionally, tape drive 10 may be used as part of an automated tape library having a plurality of tape cartridges and a robotic transfer mechanism to transport cartridges to one or more tape drives. An exemplary storage library is described in U.S. Pat. No. 5,760,995, entitled "MULTI-DRIVE, MULTI-MAGAZINE MASS STORAGE AND RETRIEVAL UNIT FOR TAPE CARTRIDGES," which is hereby incorporated by reference in its entirety. In such examples, the exemplary sensing procedure may be initiated in part or in whole by a host controller, e.g., an associated computer or computer network.

Figure 5:
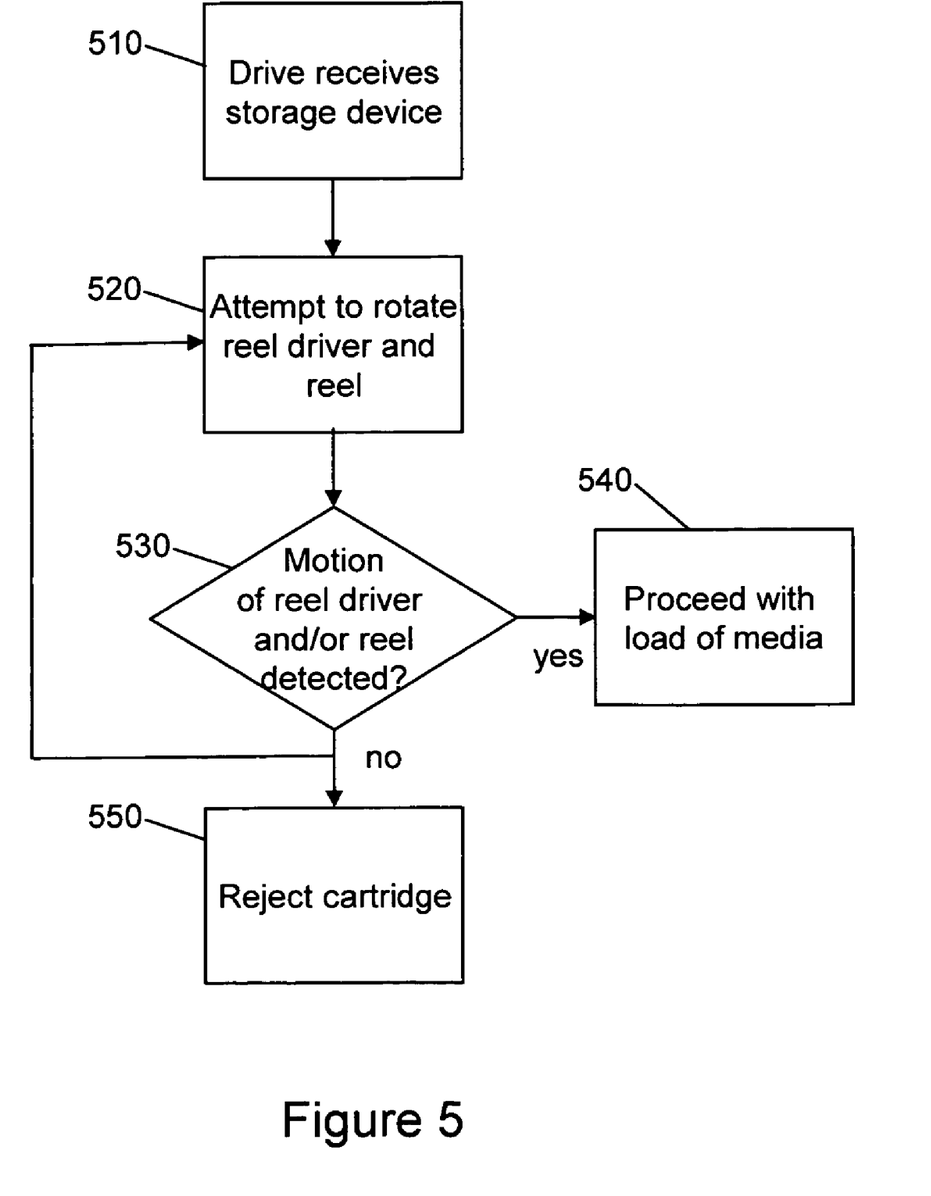
FIG. 5 illustrates an exemplary method for sensing whether a cartridge reel is released.

FIG. 5 illustrates an exemplary method for sensing if a storage device reel is released. The exemplary method may be carried out by software, hardware, firmware, or combinations thereof. In one example, the method may be embodied in computer instructions stored with the media drive controller or accessed by the media drive controller for causing the described method.

Initially, a media drive receives a storage device having at least one reel, e.g., a tape cartridge, at 510. In particular, the storage device is received by the media drive and a reel driver engages the reel of the storage device. In some examples, the media drive may further act to release reel locks, however, such action by the media drive is not necessary.

The media drive attempts to cause the reel driver and the supply reel of the cartridge to rotate at 520. For example, the media drive controller may cause a current to be applied to the drive motor to rotate the reel driver in a particular direction. The current may be relatively low relative to the current used for driving the cartridge reel during normal operation, and in a direction to unwind the tape into the media drive a predetermined distance as described herein.

The media drive detects the amount of movement, if any, of the reel driver (and of the cartridge reel) at 530. For example, a sensor may be positioned to detect motion of the reel driver. The media drive controller may receive a signal from the sensor, the signal associated with the movement or lack of movement of the reel driver in response to the attempt to move the reel driver. Further, the signal may be received by the controller as the motor is driven or at a time after the motor is driven.

If movement of the reel driver is detected at 530, or at least movement more than a predetermined amount, the media drive proceeds with loading the media from the storage device (e.g., buckling and streaming the media from the storage cartridge within the drive) at 540.

If movement of the reel driver is not detected at 530, or at least movement less than a predetermined amount, the media drive will not proceed with loading the media at 550. The controller may issue an error message, eject the cartridge, or run through other processes in an attempt to release the cartridge reel before attempting to sense the reel again. Additionally, the process may return to block 520 and attempt to rotate the reel driver again, whether before or after other processes for attempting to release the reel are performed.

Figure 6:
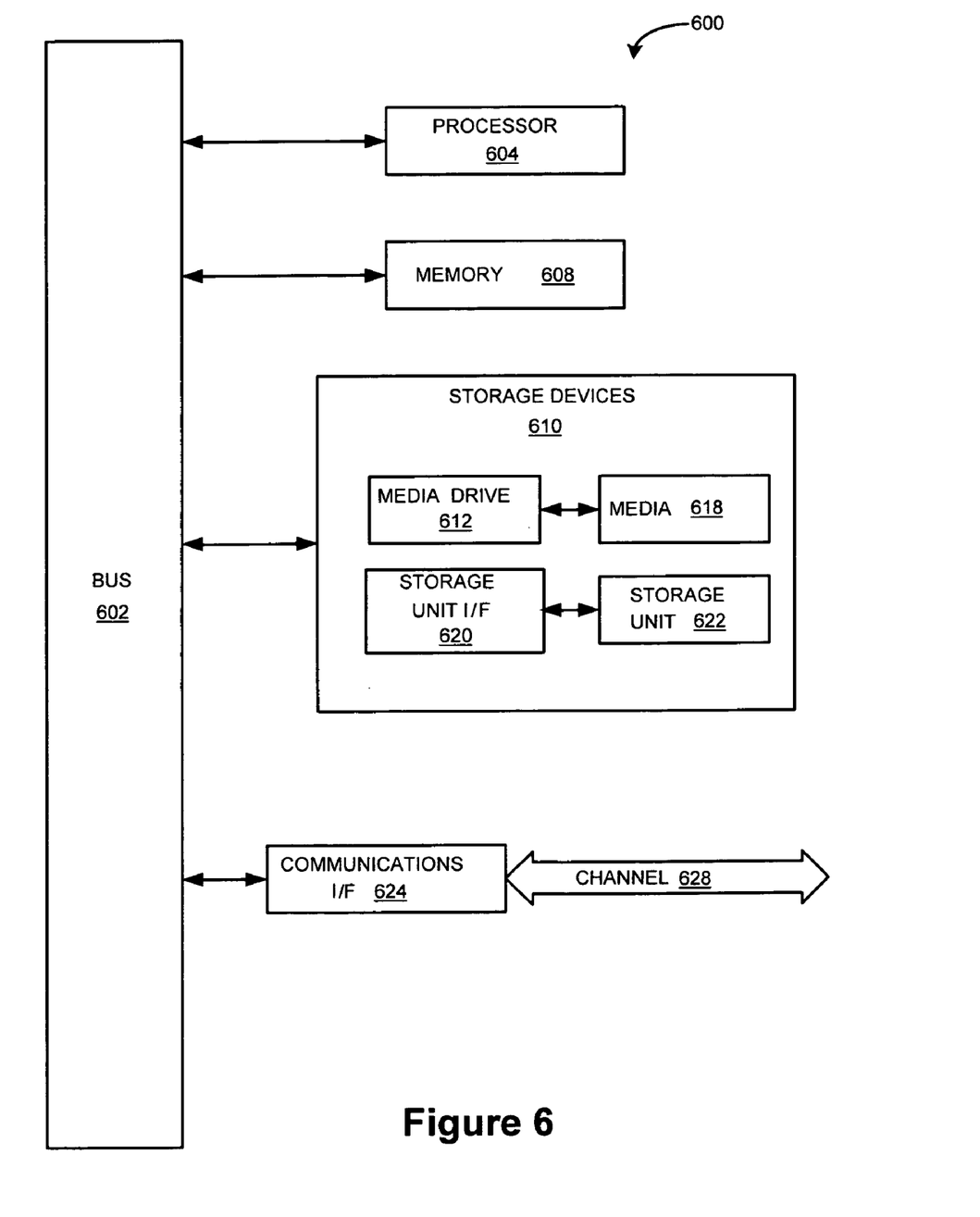
FIG. 6 illustrates an exemplary controller system that may be employed to implement processing functionality for various aspects of the present invention.

FIG. 6 illustrates an exemplary controller system 600 that may be employed to implement processing functionality for various aspects of the invention (e.g., as media drive controller 12 described with reference to FIGS. 1A-4, a host controller or computer, or other system in communication with a media tape drive). Those skilled in the relevant art will also recognize how to implement the invention using other computer systems or architectures. Controller system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Controller system 600 can also include a main memory 608, preferably random access memory (RAM) or other dynamic memory, for storing information and instructions to be executed by processor 604. Main memory 608 also may be used for storing temporary variables or other intermediate information during execution of instructions to be executed by processor 604. Controller system 600 may likewise include a read only memory ("ROM") or other static storage device coupled to bus 602 for storing static information and instructions for processor 604.

The controller system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage mechanism 610 may include other similar instrumentalities for allowing computer programs or other instructions or data to be loaded into controller system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to controller system 600.

Controller system 600 can also include a communications interface 624. Communications interface 624 can be used to allow software and data to be transferred between controller system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical, or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 608, storage device 618, storage unit 622, or signal(s) on channel 628. These and other forms of computer-readable media may be involved in providing one or more sequences of one or more instructions to processor 604 for execution. Such instructions, generally referred to as "computer program code" (which may be grouped in the form of computer programs or other groupings), when executed, enable or cause the controller system 600 to perform features or functions of embodiments of the present invention.

In an embodiment where the elements are implemented using software, the software may be stored in a computer-readable medium and loaded into controller system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above detailed description is provided to illustrate various examples and is not intended to be limiting. It will be apparent to those of ordinary skill in the art that numerous modification and variations within the scope of the present invention are possible. For example, various examples described herein may be combined and altered. Further, numerous other devices and processes not explicitly described herein may be used with the exemplary cartridges and locking mechanisms described as will be recognized by those of ordinary skill in the art. Additionally, within the description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A tape media drive for use with a removable storage device having a rotatable reel, the media drive comprising:
   a motor coupled to a reel driver for driving a reel of a storage device;
   a sensor for detecting movement associated with the reel driver; and a controller for:
- activating the motor to rotate the reel driver prior to coupling a drive leader to the storage device,
- determining if the reel driver moved more than a predetermined amount in response to activating the motor based on a signal from the sensor, and
- causing the tape to be loaded into the media drive if the reel moved more than the predetermined amount.

2. The data storage cartridge of claim 1, wherein activating the motor to rotate the reel driver comprises rotating the reel driver in a direction to unwind tape from the reel.

3. The data storage cartridge of claim 1, wherein the controller is further operable for causing a buckle mechanism to couple the drive leader to a leader of the storage device if the reel moved more than the predetermined amount.

4. The data storage cartridge of claim 1, wherein the predetermined amount is zero.

5. The data storage cartridge of claim 1, wherein the predetermined amount is based on the sensitivity of the sensor for detecting movement.

6. The data storage cartridge of claim 1, wherein the controller is further operable for causing an error signal if the reel failed to move more than the predetermined amount.

7. The data storage cartridge of claim 1, wherein the sensor includes a hall sensor.

8. The data storage cartridge of claim 1, wherein the sensor includes an optical sensor.

9. A tape media drive for use with a removable storage device having a rotatable reel and a reel lock, the media drive comprising:
- a motor coupled to a reel driver for driving a reel of a storage device;
- a sensor for detecting movement associated with the reel driver; and
- a controller for activating the motor to rotate the reel driver in a direction to unwind tape from the reel and determining if the reel is released based upon a signal from the sensor.

10. The media drive of claim 9, wherein activating the motor and determining if the reel is released is performed before a tape leader of the storage device is buckled to a drive leader.

11. The media drive of claim 9, wherein the controller further causes streaming the tape from the storage device into the media drive only if the reel is released.

12. The media drive of claim 9, wherein the controller determines the reel is locked if the sensor detects no movement or movement below a predetermined amount when the motor is activated.

13. The media drive of claim 9, wherein the controller determines the reel is released if the sensor detects movement greater than a predetermined amount.

14. The media drive of claim 9, wherein the controller receives the signal from the sensor as the motor is activated to rotate the reel driver.

15. The media drive of claim 9, wherein the controller further causes an error signal if the reel is not released.

16. A media drive controller for controlling a removable storage device media drive, the media drive controller comprising logic for:
- commanding a reel driver to rotate a reel of a storage device prior to coupling to a drive leader;
- detecting movement of the reel driver based on a signal received from at least one sensor; and
- coupling the drive leader to a cartridge leader if the detected movement exceeds a predetermined amount.

17. The media drive controller of claim 16, further comprising logic for causing media of the storage cartridge to be streamed through the drive if the detected movement exceeds the predetermined amount.

18. The media drive controller of claim 16, further comprising logic for causing a buckle mechanism to couple the drive leader to a leader of the storage device if the detected movement exceeded the predetermined amount.

19. The media drive controller of claim 16, wherein the predetermined amount is zero.

20. The media drive controller of claim 16, further comprising logic for causing an error signal if the reel failed to move more than the predetermined amount.

21. The media drive controller of claim 16, wherein the reel driver is commanded to rotate in a direction to unwind tape from the reel of the storage device.

22. A method for sensing if a reel of a storage device is released when received in a media drive, the method comprising,
- rotating a reel driver to rotate a reel of a storage device prior to coupling the storage device to a drive leader;
- detecting movement of the reel driver based on a signal received from at least one sensor; and
- loading the media if the detected movement exceeds a predetermined amount.

23. The method of claim 22, further comprising determining the reel is released if movement of the reel is greater than zero.

24. The method of claim 22, further comprising determining the reel is locked if detected movement of the reel is less than the predetermined amount.

25. The method of claim 22, further comprising causing an error signal if the detected movement does not exceed the predetermined amount.

26. The method of claim 22, wherein the reel of the storage device is rotated in a direction to unwind tape from the reel.

* * * * *